3,060,620
WEEDLESS HOOK SKIRT
Andrew Binkowski, 910 Chicago Ave., Lansing, Mich.
Filed Jan. 26, 1959, Ser. No. 788,809
2 Claims. (Cl. 43—42.24)

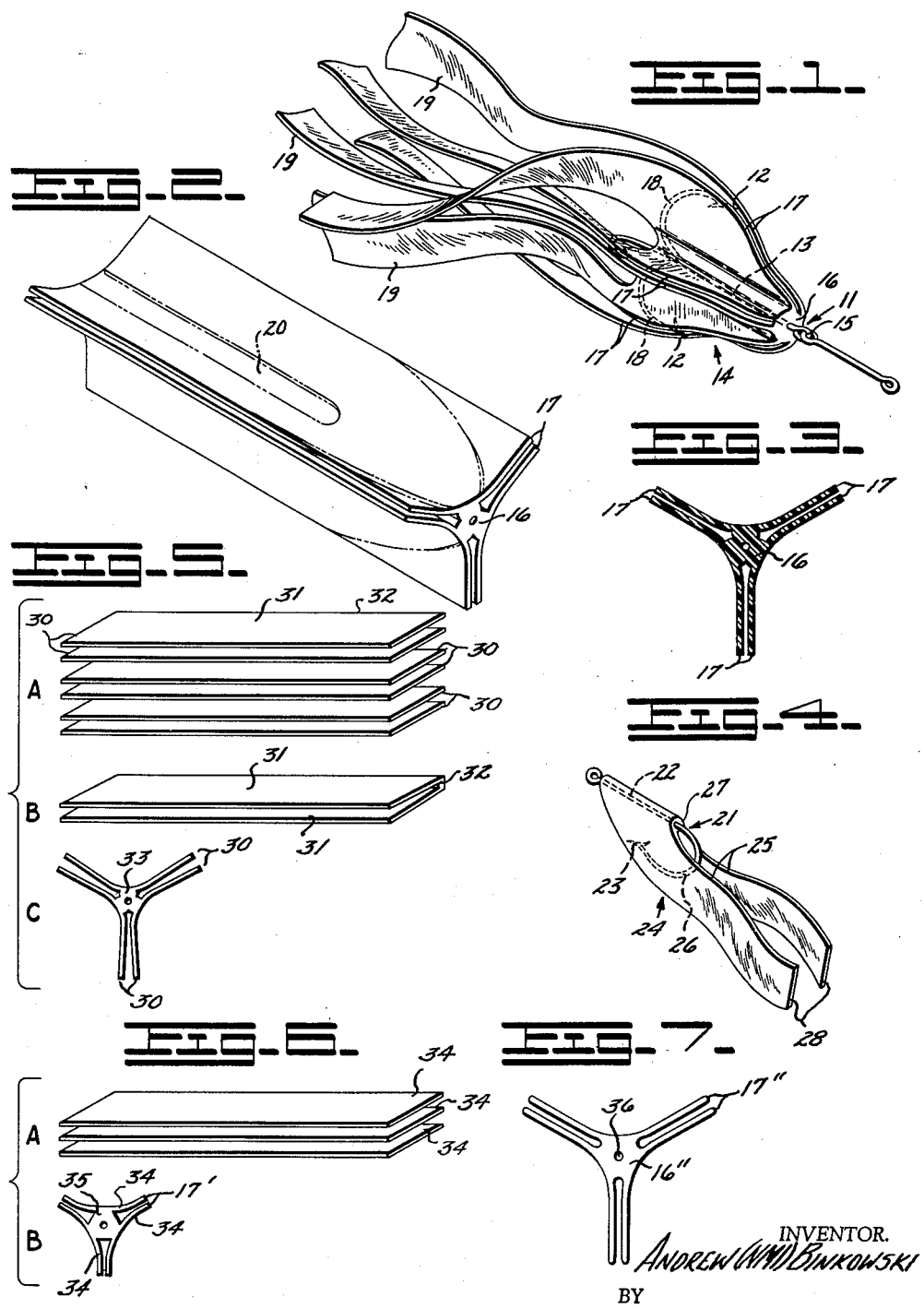

The present invention relates to the art of making fish hooks substantially weed free. More particularly the present invention relates to a skirt to be applied over the shank portion of a hook and extending rearwardly and radially therefrom in a form to resiliently or pliantly shroud the barb point or points of a hook. Still more particularly the skirt of the present invention performs the function of a fishing lure in combination with the associated hook.

In the art of artificial fish lure making the problem of providing a weedless hook has been uppermost in the minds of manufacturers of artificial lures. The problem is magnified when it is appreciated that the hook rendered weedless must retain its hooking characteristics in relationship to the fish. To date the best approaches have employed metal guide vanes or wires which extend from the shank of the hook served so as to guide the barbs or hook points from encounter with weeds or obstacles. When a fish strikes the hook the deflecting filament-like vanes are depressed and the barb is considered effective. However, if the fish encounters the vane from a side angle or hook shank approach it is argued that the lure is thrust away from the line of attack. Attempts to alleviate this problem have resulted in the development of filaments wich are substantially coterminous with the barb so that the attack of a fish is less likely to cause a resultant pushing away of the lure. All of such prior art weedless hooks have been adopted for attachment to various plugs, jigs, spoons, spinners and the like. The desirability of evolving a weedless lure is apparent when it is appreciated that weed infested waters form some of our best fishing waters.

The present invention is an entirely new approach to the provision of a weedless hook and lure. The skirt accomplishes a weedless performance in relationship to the hook and at once also serves as an artificial lure in and of itself. The trailing strands or strips extending from the skirt flail the water in an agitated way causing erratic movement of the lure formed by the combination of hook and skirt.

In the drawing:

FIGURE 1 is a perspective view of a skirt prepared in accord with the present invention over the shank portion of a treble hook and indicates the shrouding of the hook barbs.

FIGURE 2 shows the hook skirt in perspective view as illustrated in FIGURE 1 prior to being slipped over the hook shank and indicating the trim lines in phantom line.

FIGURE 3 is a cross section view of the skirt illustrated in FIGURE 2 and illustrates the spacing of the pliant fins so as to form shrouds for the barb points of a hook.

FIGURE 4 illustrates a modified form of skirt in perspective as mounted on the shank of a single point.

FIGURE 5 schematically illustrates the forming of a weedless skirt in accord with the present invention using pliant strips.

FIGURE 6 is a schematic representation to show a second method of forming the weedless skirt using only three strips of stock.

FIGURE 7 is an end elevation of a weedless skirt in accord with the present invention as extruded to form the device of the present invention.

Referring with particularity to FIGURE 1, a treble hook 11 is shown having barbed hook points 12 extending radially from the hook axis as established by the shank portion 13. The shank 13 receives a skirt or shroud 14 threaded onto the shank 13 over the hook eye 15. The skirt or shroud 14 comprises a tubular sleeve 16 having radially extending pairs of spaced apart fins 17. Each pair of fins 17 provide a planar opening therebetween into which the curved portions 18 of the hook 11 is sandwiched. The inner faces of the fin pairs 17 thus provide planar cheeks which flank the curve 18 of the hook 11. The fins 17 are then trimmed to suit the angler forming a plurality of streamer tails 19 and coterminous with the barbed points or hook tips 12. In FIGURE 2, the trim lines are shown which result in the weedless lure shown in FIGURE 1. The actual finish trimming is best accomplished after assembly of the skirt 14 over the hook shank 13, with the slotted portion 20 being cut away in accord with shank length. Then trimming to the hook points 12 is accomplished in accord with hook size and the desire of the angler. FIGURE 3 best illustrates the fins 17 extending radially in pairs from the sleeve 16.

In FIGURE 4 the device of the present invention is shown in association with a single point hook 21 having shank portion 22 and hook point 23. The skirt 24 comprises a single pair of radially extending fins 25 spaced apart to accommodate the planar insertion of the bent portion 26 of the hook 21. A tubular sleeve 27 is provided which is attached longitudinally to the fins 25 and which is slipped over the hook shank 22. As in the modification shown in FIGURE 1, upon assembly over the hook shank 22, suitable trimming of the fins 25 to coincide radially with the hook tip 23 results in excellent weedless performance and the extending streamer ends 28 result in erratic performance as a fishing lure.

The trailing streamer ends 28 establish, as do the ends 19 in FIGURE 1, an unusual and erratic turbulence which can be adjusted by the angler in his trimming of the skirt to suit his fishing problem.

The material comprising the skirt of the present invention must be pliant and available in sheet form for the fin pairs 17 and 25. The fins must be bonded to the tubular sleeve 16 and 27. Preferably the bond is integral so that the material comprising the fins is of the same material comprising the sleeve 16 and 27. Examples of satisfactory material having the requisite pliant properties are latex rubber, synthetic soft rubber, and polyethylene. This list is not intended to limit or exhaust the materials which may be used but is intended to show the quality of resiliency and pliancy required in the finished skirt by way of example.

Very acceptable hook skirts have been prepared using the methods schematically represented in FIGURES 5-7, inclusive. The first method (FIGURE 5) involves three steps: (A) The assembly of pairs 30 of flat strips 31; (B) the application of cement along one edge 32 of each of the pairs 30 of strips 31; (C) the orienting of the pairs 30 of strips 31 so that the closed edges 32 come together to form a closure around a needle sized mandrel (not shown.) Thus oriented, the adhesive material is cured to set up the system of radially disposed fins over the tubular sleeve 33 as shown at (C). A long strip of skirting, thus formed, may then be chopped up into useable sized segments. As has been described a skirt thus formed is adaptable to a wide range of hook sizes.

A second method (FIGURE 6) involves the preparation of a plurality of strips 34, which are then folded along their longitudinal centerline and adhered to an adhesive coated mandrel (not shown) with the adhesive cured to form the tubular sleeve 35 from which the fins 17' extend in spaced apart pairs. This is best illustrated in steps A and B of FIGURE 6. In both of the methods illustrated in FIGURES 5 and 6, the selection of adhesive material should be carefully made so that upon curing the materials forming the fins and the sleeve are substantially integral. To avoid the sticking together of the strip material forming the fins a parting agent such as wax or powder may be employed during assembly.

A third process of manufacture is available as shown in FIGURE 7. FIGURE 7 shows an end elevation of an extrusion wherein fins 17″ and sleeve 16″ are integrally formed leaving a central longitudinal opening 36 into which the hook shank is inserted upon assembly to form a weedless lure. This latter process makes available a very high rate of production and segments are cut from the extrusion strip in lengths calculated to accommodate various hook lengths.

Where the treble hook form of the device is prepared (FIGURE 3) it will be appreciated that the angler may trim off two of the fin pairs for use with a single point hook as shown in FIGURE 4. Similarly the form of the device may be modified to accommodate various plural point hook arrangements. The addition of pigments to the material forming the skirt material provides a wide range of color combinations available to the angler.

In use, the pliancy and resiliency of the fin material shrouding the hook tip assures the fending off of weeds and tendrils customarily associated with trolling and casting of subsurface fishing lures. Appropriately trimmed, the lures provide considerable animation in the water and the pliancy of the skirt materials is believed to impart a "feel" of life-like consistency when the lure is mouthed by a striking fish. The hooking characteristics in tests have proved excellent. In use, a set of hooks and a range of colors for the skirts provide a wide range of lure characteristics available. The width and pliancy of the rearwardly extending streamer strips result in an unusual lure performance.

Other modifications of structures described will be appreciated by those skilled in the art and such modifications are intended to be included herein limited only by the scope of the hereinafter appended claims.

I claim:
1. A fishing lure in cross section comprising: a central tubular resilient elongate sleeve element; a hook shank over which said sleeve is positioned; pairs of parallel spaced apart radial extensions integral with said sleeve element and intersecting said sleeve along its entire length, each pair providing therebetween a planar slot therethrough having open outer edges; a curvalinear hook portion extending from said hook shank and terminating in a tip and barb nested between each pair of said extensions and in the slot formed thereby; cheeks formed in each of said pairs of radial extensions in flanking registry with the profile of said curvalinear portion of said hooks; and rearwardly extending streamer portions integral with and extending from said radial extensions.

2. A fishing lure for attachment over the shank of fishing hooks comprising: a central tubular resilient elongate sleeve; at least one pair of paralleled spaced apart radial planar extensions integral with said sleeve and intersecting said sleeve along its entire length, each such pair of radial extensions together having inner cheeks defining a planar slot therethrough with an open outer edge and open at both ends thereof, each of said slots thus defined providing a hook curve pocket.

References Cited in the file of this patent
UNITED STATES PATENTS

| | | |
|---|---|---|
| 779,744 | Shakespeare | Jan. 10, 1905 |
| 1,568,325 | Dewey | Jan. 5, 1926 |
| 2,112,901 | Anderson | Apr. 5, 1938 |
| 2,268,541 | Arbogast | Jan. 6, 1942 |
| 2,544,265 | Kelley et al. | Mar. 6, 1951 |
| 2,589,435 | Roeben | Mar. 18, 1952 |
| 2,616,209 | Ploen | Nov. 4, 1952 |
| 2,623,321 | Braukus | Dec. 30, 1952 |
| 2,753,651 | Fisher | July 10, 1956 |
| 2,811,804 | Heath | Nov. 5, 1957 |
| 2,981,027 | Dewyer | Apr. 25, 1961 |